United States Patent
Chang

(10) Patent No.: US 8,534,042 B1
(45) Date of Patent: Sep. 17, 2013

(54) MODULAR MEMS THRUSTER SYSTEM UTILIZING ROLLED STORAGE, SELECTIVE DEPLOYMENT AND INDEPENDENT INITIATOR

(75) Inventor: Rayming Chang, El Segundo, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 872 days.

(21) Appl. No.: 12/691,103

(22) Filed: Jan. 21, 2010

(51) Int. Cl.
*F02K 9/28* (2006.01)

(52) U.S. Cl.
USPC .............................................. 60/204; 60/250

(58) Field of Classification Search
USPC ................. 60/200.1, 250, 251, 253, 257, 204
See application file for complete search history.

(56) References Cited

U.S. PATENT DOCUMENTS

| | | | | |
|---|---|---|---|---|
| 3,263,419 A | * | 8/1966 | Schmitz | 60/250 |
| 3,316,719 A | * | 5/1967 | Loprete | 60/256 |
| 3,328,963 A | * | 7/1967 | Kraus | 60/250 |
| 3,726,649 A | * | 4/1973 | Pelham | 422/113 |
| 5,671,599 A | * | 9/1997 | Hocheri | 60/234 |
| 5,718,113 A | * | 2/1998 | Hayes | 60/251 |
| 5,836,150 A | * | 11/1998 | Garcia | 60/256 |
| 6,378,292 B1 | * | 4/2002 | Youngner | 60/224 |
| 6,487,844 B1 | * | 12/2002 | Lohn et al. | 60/200.1 |
| 2004/0031259 A1 | * | 2/2004 | Baricos et al. | 60/224 |

* cited by examiner

*Primary Examiner* — Phuttiwat Wongwian
*Assistant Examiner* — Scott Walthour
(74) *Attorney, Agent, or Firm* — AFMCLO/JAZ; Fredric Sinder

(57) ABSTRACT

A new micro electro-mechanical system (MEMS) satellite thruster is described. An example of the new MEMS thruster includes a propellant layer on a flexible substrate to make a rolled propellant that can be mounted on a reel-to-reel system. Sections of the rolled propellant are rolled over a separate activation blast plate to initiate the propellant on that section, providing thrust. The new MEMS thruster can also be made with segmented propellant sections. The new MEMS thruster can be made in a variety of configurations and as a modular system that can be attached to existing satellites.

6 Claims, 3 Drawing Sheets

MODULAR MEMS THRUSTER SYSTEM UTILIZING ROLLED STORAGE, SELECTIVE DEPLOYMENT AND INDEPENDENT INITIATOR

RIGHTS OF THE GOVERNMENT

The invention described herein may be manufactured and used by or for the Government of the United States for all governmental purposes without the payment of any royalty.

BACKGROUND OF THE INVENTION

The present invention relates generally to thrusters for satellite and other spacecraft propulsion, and more particularly to a Micro Electro-Mechanical System (MEMS) thruster.

Satellites require thrusters, or similar systems, for such satellite propulsion purposes as orbit raising, orbit maintenance and attitude control.

MEMS thrusters are micro-thrusters built upon a substrate of silicon or similar material. MEMS thrusters are built on a very small scale, usually on the order of millimeters. MEMS thrusters can use a variety of fuels including gases, solid fuel and liquid fuel. Example proposed MEMS thrusters are described in U.S. Pat. Nos. 7,516,610 to Gilchrist et al., 6,516,604 to Mojarradi et al. and 6,378,292 to Youngner.

The promise of any MEMS technology is that it can leverage fabrication techniques from the integrated circuit (IC) industry to create ultra-miniaturized components. IC fabrication technologies enable integration of multiple functions on a single substrate or platform; inherently precise micromachining for better performance than traditional devices; batch fabrication to reduce manufacturing cost and time; and, of course, miniature parts.

MEMS thrusters have been proposed for propulsion on small satellites in a variety of configurations, offering a variety of advantages over traditional satellite propulsion systems.

Despite the promise of those proposed MEMS thrusters, they are based on flat panels with rigid substrates, suffering from disadvantages inherent to those approaches and otherwise not offering all the possible advantages from utilizing advanced MEMS technologies for MEMS thrusters.

It is, therefore, an object of the present invention to provide new and improved MEMS thrusters that both eliminate disadvantages of existing proposed MEMS thruster approaches and provide new advantages not found in the existing thruster prior art.

SUMMARY OF THE INVENTION

The present invention provides a new MEMS satellite thruster that provides significant advantages over prior art proposed MEMS satellite thrusters beyond the advantages already obtainable from those MEMS-based approaches.

Unique discoveries of the present invention include: first, a MEMS thruster built on a flexible substrate, providing a rolled propellant that makes possible reel-to-reel or roll-to-roll MEMS thrusters that, among other advantages, provide a compact thruster with rolled storage of additional propellant; second, an activation or initiator component of a MEMS thruster separate from the propellant for both safety and design flexibility; and, third, a segmented rolled propellant providing the advantages of the present invention for propellants that are not flexible. Such inflexible propellants most often will be propellant systems, such as gas or liquid fuel based propellant systems, that, unlike solid fuel propellants, require substantial additional apparatus to operate, and may also include arrays of different propellant systems and even include inflexible solid fuel propellants.

Accordingly, the present invention is directed to a propulsion apparatus comprising a propellant and an initiator, wherein the initiator is positioned so that regions of the rolled propellant can move relative to the initiator.

The present invention is also directed to a propulsion apparatus comprising a rolled propellant and an initiator, wherein the initiator is positioned so that regions of the rolled propellant can move relative to the initiator. The rolled propellant may comprise a solid fuel propellant or an array of different propellants. The initiator may be an activation blast plate. The propulsion apparatus may also comprise a segmented rolled propellant.

The present invention is further directed to a propulsion apparatus having a rolled propellant, the rolled propellant comprising a propellant layer over a flexible substrate. The propellant layer may be segmented. The propulsion apparatus may further comprise an initiator, wherein the initiator is positioned so that regions of the rolled propellant can move relative to the initiator.

DETAILED DESCRIPTION

This description of example reel-to-reel embodiments of the invention includes two primary variations. One is a continuous flexible roll that has discrete regions which come into contact with an activation blast plate (acting as an initiator) in order to activate a propellant. The other has rigid segments that come into contact with an activation blast plate when advanced in order to be activated.

Figure 1:
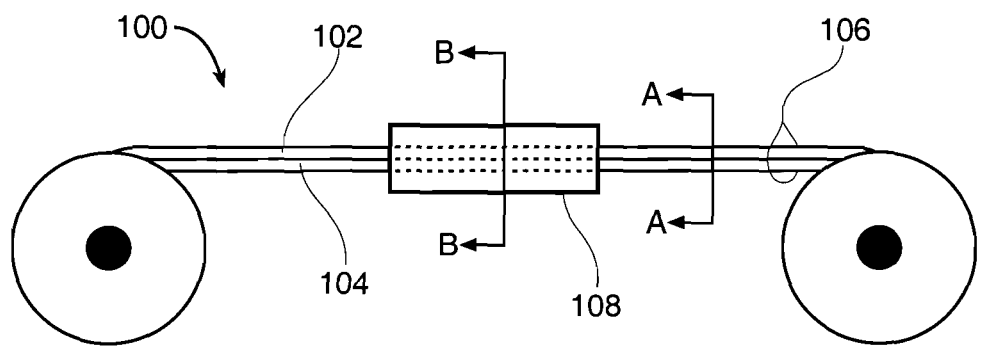
FIG. 1 is a representational view of a MEMS thruster having a separate activation blast plate according to the teachings of the present invention.

Referring now to the drawings, FIG. 1 is a representational view of a MEMS thruster 100 according to the teachings of the present invention. Prior art proposed MEMS thrusters focus on flat panels with rigid substrates, significantly limiting the surface area available for solid propellants and requiring complex apparatus for storage and delivery of other propellants to the actual thruster. Thruster 100 has two primary components, a layer of propellant 102 over a flexible substrate 104 forming a belt or ribbon 106, and a separate activation blast plate 108. Activation blast plate 108 is a combination blast plate and initiator. An initiator, also called an igniter or actuator, initiates or fires a propellant to begin thrust. Initiators operate by a wide variety of approaches well known in this and related arts. A blast plate protects against blasts and makes certain the thrust from a propellant is directed outward and protects other assemblies from damage from the propellant. Belt 106 moves across activation blast plate 108 where successive regions of propellant 102 can be initiated to propel a satellite.

Thruster 100 is shown here in a reel-to-reel or roll-to-roll configuration. While a MEMS thruster built according to the teachings of the present invention does not require a rolled belt 106 in order to move relative to a separate initiator (activation blast plate 108 in this example embodiment), a rolled propellant provides rolled storage of additional propellant and is the currently preferred mode.

Separate or independent initiators, such as activation blast plate 108, are safer than comparable liquid and solid propellant systems because the fuel is dispersed and can only ignite when in contact with an initiator or activation plate. There is also less exposure to stray voltage or current and accidental misfires because the thrusters can only ignite when in contact with an activation blast plate.

Thruster 100 provides other significant advantages over prior art proposed MEMS thrusters. It will be easier to manufacture than standard liquid-based propellant systems that require fuel tanks, propellant lines and fluid control. It will allow much finer control of the amount of thrust because each propellant region contains only a known tiny amount of fuel, which does not necessarily exist with such traditional propellant systems as liquids, which usually require some guesswork, and with traditional solid systems that continue to fire until exhausted.

Fuel efficiencies potentially will rival Hall Effect and other low specific impulse thrusters. This approach is potentially cheaper and more mass efficient than competing technologies.

The beauty of this system is its simplicity.

Figure 2:
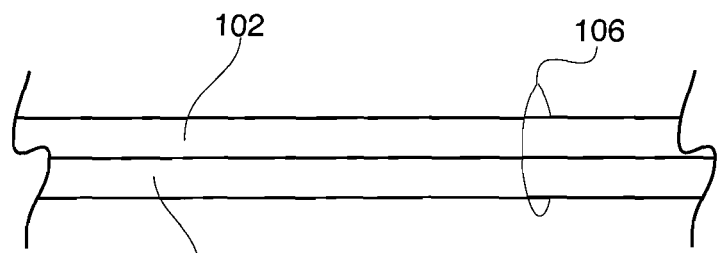
FIG. 2 is an expanded cross-sectional view of the propellant component of the MEMS thruster of FIG. 1 along line A-A.

FIG. 2 is an expanded cross-sectional view of a part width of propellant layer 102 and flexible substrate 104 along line A-A of rolled belt 106 of MEMS thruster 100 of FIG. 1.

The use of a flexible substrate allows MEMS thrusters that can be efficiently rolled as shown in FIG. 1. These flexible substrates can be made of polymers, metals and even paper. Current state of the art utilizes polyimide and similar materials. As described in the Background, an advantage of any MEMS technology is that it can borrow fabrication approaches from the integrated circuit industry, including developing advances such as roll-to-roll processing, also known as 'web' processing, reel-to-reel processing or R2R, for making electronic devices on a roll of flexible plastic or metal foil. Flexible substrates can also be made by borrowing from related technologies, such as that used in making E INK electronic paper.

Substrate 104 may include a second durable material as reinforcing strips along the substrate for strengthening.

As will be seen by those with skill in the art, propellant layer 102 will likely include a protective film which will disintegrate on ignition of the propellant.

Figure 3:
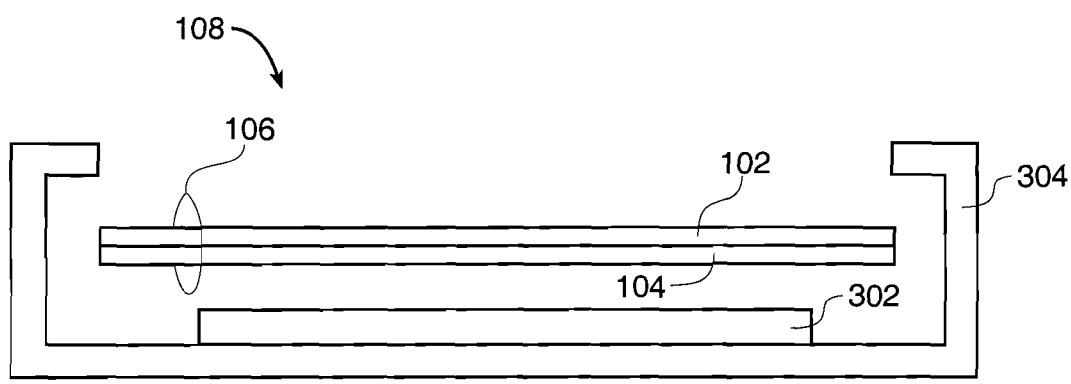
FIG. 3 is an expanded cross-sectional representational view of the separate activation blast plate of FIG. 1 along line B-B.

FIG. 3 is an expanded cross-sectional representational view of the activation blast plate 108 of FIG. 1 along line B-B. In this example embodiment, activation blast plate 108 representationally includes an initiator element 302 and a frame 304. Both initiator 302 and frame 304 can perform a blast plate function and are not necessary separate components.

Figure 4:
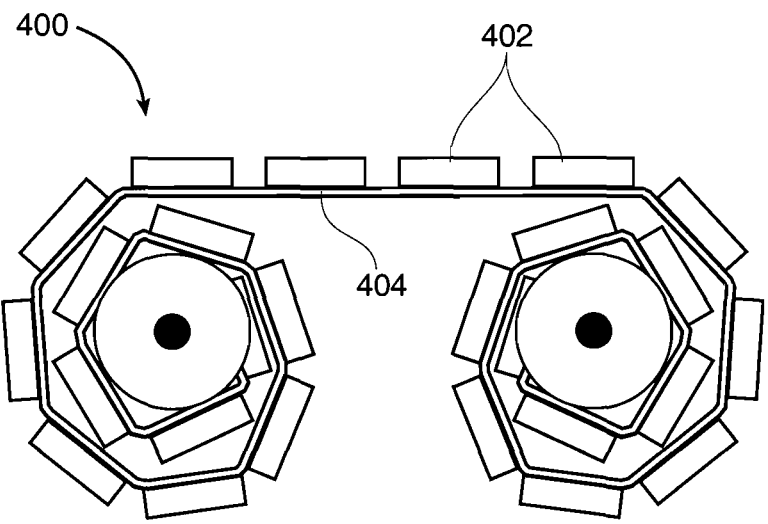
FIG. 4 is a representational view of a segmented rolled propellant component of a MEMS thruster according to the teachings of the present invention.

FIG. 4 is a representational view of a segmented rolled thruster 400 according to the teachings of the present invention showing the use of segmented flat MEMS propellant regions 402 on a substrate 404. This configuration provides the advantages of thruster 100 without requiring a flexible solid fuel propellant and also allows use of other than solid fuel propellant designs. Substrate 404 will most often be flexible, but may be itself inflexible and a segmented rolled thruster 400 constructed similarly to, for example, tractor or tank treads.

Figure 5:
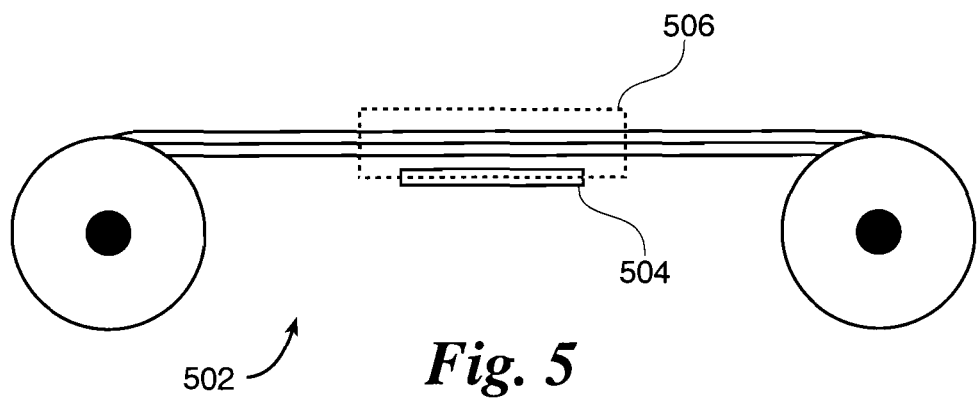
FIG. 5 is a representational view of a rolled propellant and separate activation blast plate according to the teachings of the present invention including a representational view of an example guide and advancing mechanism.

FIG. 5 is a representational view of a rolled thruster 502 and separate activation blast plate 504 according to the teachings of the present invention including a dashed line representational view of an example guide and advancing mechanism 506. Guide and advancing mechanism can be based on movie projector film advance and similar mechanisms.

Figure 6:
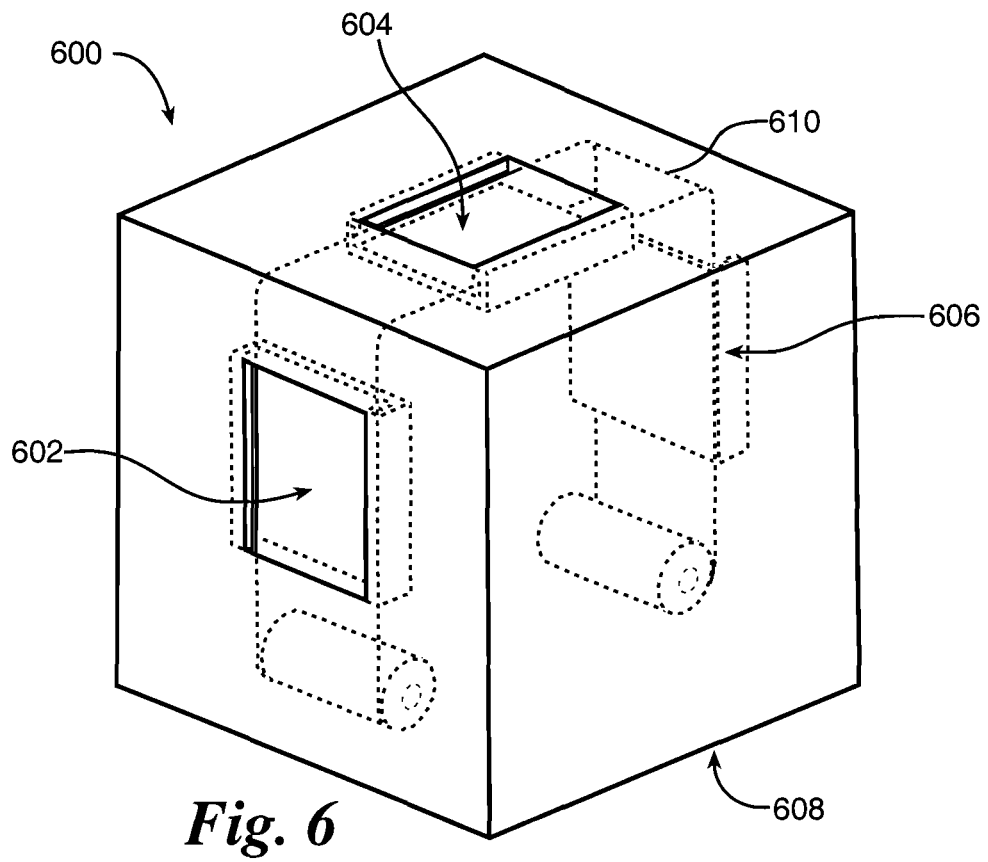
FIG. 6 is a representational view of a MEMS thruster according to the teachings of the present invention having three separate activation blast plates.

FIG. 6 is a representational view of a MEMS thruster 600 having three separate activation blast plates 602, 604 and 606 allowing, for example, greater directional control of a satellite. The addition of a housing 608 makes MEMS thruster 600 into a modular or cartridge MEMS thruster assembly.

MEMS thruster 600 preferentially has a single rolled belt 610, but may include a plurality of belts and rollers.

As described in reference to FIG. 1, separation of the activation blast plate from the substrate strip creates a safeing mechanism whereby the propellant cannot be exploded unless correctly placed on an activation blast plate. MEMS thruster 600 illustrates the use of activation blast plates for orientation in addition to safety. A MEMS thruster according to the teachings of the present invention can have one or more activation blast plates. If there is only one activation blast plate, then that activation plate can be oriented at an angle relative to the spacecraft that is most efficient for a specific mission. In an example embodiment with more than one activation plate, as shown in FIG. 6, the resulting thruster system will be able to provide thrust in multiple directions. Although more mechanically complex, a single activation blast plate could be installed on a gimbal or other pointing mechanism to allow it to point along different axes.

Figure 7:
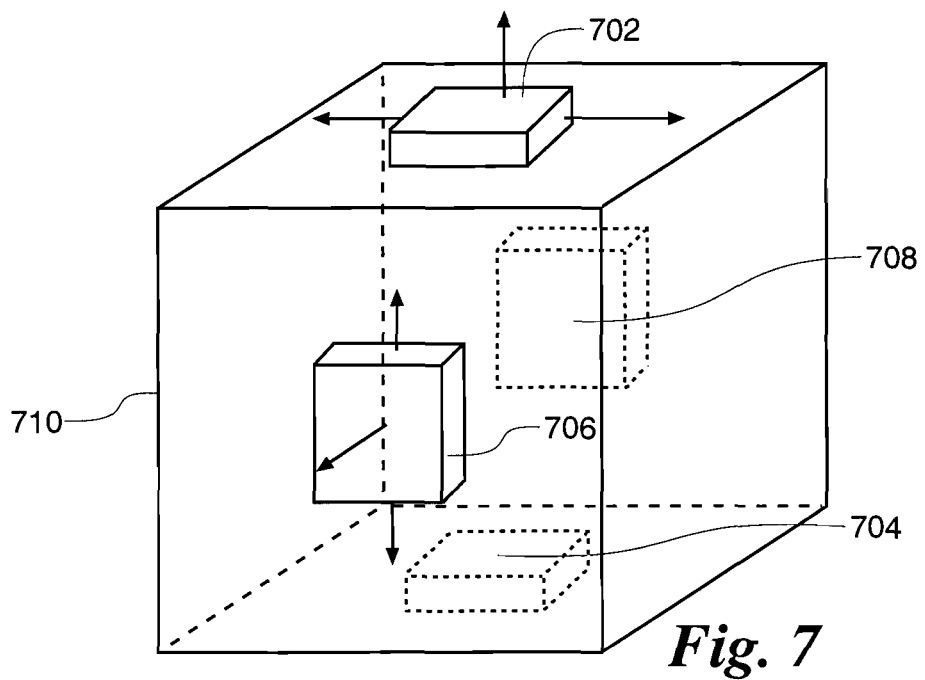
FIG. 7 is a representational view of a satellite with four modular MEMS thrusters similar to the MEMS thruster of FIG. 6.

FIG. 7 is a representational view of four MEMS thrusters 702, 704, 706 and 708, each similar to MEMS thruster 600 of FIG. 6, mounted on four sides of a satellite 710. Thrusters 702, 704, 706 and 708 could be part of satellite 710 as originally constructed or added later.

The MEMS thrusters can be installed internally or externally. The most versatile embodiment would be an external installation, but there may be situations where it is desirable to have the thruster system installed internally.

Raising the thrusters off the surface of a small satellite, as shown in FIG. 7, will reduce blast damage to and residue deposits on adjacent parts.

MEMS thrusters 702, 704, 706 and 708 additionally represent another example embodiment of the present invention in the form of a replaceable cartridge containing a roll-to-roll MEMS thruster system. The cartridge would be modular and could be replaced by a servicing satellite similar to one that demonstrated the feasibility of refueling and restocking a satellite in 2007. The replaceable cartridge embodiment can simplify resupply because a servicing satellite can replace a cartridge much more easily than a complete propulsion system. Such a MEMS thruster cartridge system could also used to rescue, and thus extend the life of, existing aging satellites that are running out of fuel. Such a system could also be used to de-orbit or raise orbits of dead satellites, which would be particularly valuable for geosynchronous satellites.

MEMS thrusters built according to the teachings of the present invention will require substantially less satellite surface area than comparable flat panel MEMS thrusters and other satellite thruster approaches.

Whether remotely in space on an existing satellite, or as part of original construction, it will be much easier to install a modular rolled MEMS thruster built according to the teachings of the present invention than a complex liquid based propellant system. As stated previously, the beauty of this system is its simplicity.

Although the primary teaching of this invention is for MEMS thruster use, it can also be applied to sensors, communications equipment, exposure of experiment platforms, and other extraterrestrial uses that require selectable exposure. For example, for sensors that need to be pointed precisely to have exactly the same view, multiple sensors can be installed on a substrate and rotated.

A module thruster according to the teachings of the present invention can accommodate a variety of MEMS thrusters. The currently preferred embodiment would use a solid fuel. However, a modular thruster could accommodate other chemical fuels including monopropellant, bipropellant and hybrid. Different types of MEMS thrusters can coexist within a single device which would allow operators to select between types of thrusters (with different configurations, propellant and specific impulses) depending on the situation. The different thruster types could all be manufactured on the same substrate. The location of the specific types of thrusters can either be store in a local controller or coded into the substrate itself (through magnetic or other means).

Regarding the region of a rolled propellant in contact with an activation blast plate, a simple embodiment could contain different types and amounts of propellant connected in series on the region in contact with the activation blast plate so that all the propellant regions would activate simultaneously. This embodiment would avoid some of the complexity of addressing and selection that comes with an array of MEMS thrusters and could incorporate arrays of individually controlled thrusters such as are described in U.S. Pat. No. 6,378,292 to Youngner. Each array would preferably be sized to fit over a single activation blast plate, but could also include propellant regions, or sub-regions, not over the activation blast plate. Such arrays of different propellant approaches can provide greater flexibility and precision in choosing how much thrust or impulse is used. Those having skill in the art will see that the segments 402 of FIG. 4 can include such arrays and be broadly understood as including such arrays.

MEMS thrusters can be arranged in groupings of several modular cartridges. Using more than one cartridge on the same plane of a satellite increases system redundancy. Also, in a modular system, using several, including a variety of different, cartridges, instead of customizing a cartridge for a particular satellite, can reduce costs.

The teachings of the disclosed new and improved approach for a MEMS thruster system will find application in other areas where new capabilities made possible by MEMS-based technologies, both those borrowed from integrated circuit and other solid state electronics fabrication techniques, and those newly developed in other MEMS art areas, may be utilized in new ways not needed or contemplated in those other art areas.

Various modifications to the invention as described may be made, as might occur to one with skill in the art of the invention, within the scope of the claims. Therefore, all contemplated example embodiments have not been shown in complete detail. Other embodiments may be developed without departing from the spirit of the invention or from the scope of the claims.

For example, such additional features as a protective film as either part of or applied over a propellant layer will be readily added by those having skill in the art when needed for a specific implementation of the invention.

For an additional example, the described example embodiment of this invention uses MEMS on a millimeter-scale, but can be scaled in size to fit specific applications. Similarly, the region of any rolled propellant then over an initiator when fired need not all comprise propellant, but may be, as described with regard to prior art proposed MEMS thruster arrays, be a more complex propellant apparatus or assembly.

I claim:
1. A modular propulsion apparatus, comprising:
   (a) a housing having a plurality of openings;
   (b) a corresponding plurality of activation blast plates inside the housing, one each activation blast plate in a spaced relationship over each opening, each activation blast place including:
      (i) an initiator; and,
      (ii) a blast plate; and,
   (c) a belt arranged in a roll-to-roll configuration inside the housing such that the belt can be rolled across the plurality of openings in the space between each opening and each activation blast plate, the belt including:
      (i) a flexible substrate; and,
      (ii) a layer of propellant over the flexible substrate.
2. The modular propulsion apparatus of claim 1, wherein the layer of propellant is segmented.
3. The modular propulsion apparatus of claim 2, wherein at least one propellant segment is made of a different propellant material than at least one other propellant segment.
4. A method for moving an object, comprising the steps of:
   (a) placing at least one modular propulsion apparatus on the object, the modular propulsion apparatus including:
      (i) a housing having a plurality of openings;
      (ii) a corresponding plurality of activation blast plates inside the housing, one each activation blast plate in a spaced relationship over each opening, each activation blast place including:
         (A) an initiator; and,
         (B) a blast plate; and,
      (iii) a belt arranged in a roll-to-roll configuration inside the housing such that the belt can be rolled across the plurality of openings in the space between each opening and each activation blast plate, the belt including:
         (A) a flexible substrate; and,
         (B) a layer of propellant over the flexible substrate.
5. The method according to claim 4, wherein the layer of propellant is segmented.
6. The method according to claim 4, wherein at least one propellant segment is made of a different propellant material than at least one other propellant segment.

* * * * *